H. L. BEACH.
MOTOR CONTROL SYSTEM.
APPLICATION FILED OCT. 23, 1913.

1,231,557.

Patented July 3, 1917.

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,231,557.   Specification of Letters Patent.   Patented July 3, 1917.

Application filed October 23, 1913.   Serial No. 796,832.

*To all whom it may concern:*

Be it known that I, HOWARD L. BEACH, a citizen of the United States, and a resident of Edgewood Park, in the county of Allegheny and State of Pennsylvania, have invented a new and useful Improvement in Motor-Control Systems, of which the following is a specification.

My invention relates to motor control systems, and it has special reference to systems employed in connection with elevators, planers and similar machines.

My invention has for its object to provide a simple and effective system of control whereby an electric motor may be accelerated smoothly and gradually.

It is well known that the torque of an electric motor varies directly with the strength of its magnetic field and with the value of the armature current. In systems of control which provide for a constant armature current during the acceleration of a motor from standstill to full speed with the field weakened, the torque will be substantially double its normal full speed value until approximately half speed is reached and, as a result, the motor will start with a jerk and will be accelerated at an excessively rapid rate. If the motor be accelerated with the armature current so controlled as to correspond to full-load torque with a strong field during armature acceleration, and to correspond to full-load torque with weakened field during field acceleration, a jerk will occur at approximately half speed because of the sudden increase in torque at this point. If, however, the armature current be increased gradually during armature acceleration from full-load current value with a strong field to full-load current value with a weak field, the motor will start easily and accelerate without jerk or jar, the torque gradually reaching a maximum value at approximately half speed and then falling off again to a normal value at full speed, as the field is weakened.

To accomplish this latter result, I have provided a system comprising a compound-wound relay switch having a series coil in the armature circuit and a shunt coil in parallel with all or part of the starting resistor for controlling the switches which cut out the starting resistor. The system also comprises a series relay switch for controlling the field resistor. A modification of my invention comprises a series of self-closing switches that operate to cut out the starting resistor, a series relay switch which controls the field resistor and a second series relay switch for controlling the first to insure a strong field until the starting resistor is entirely cut out.

Figure 1:
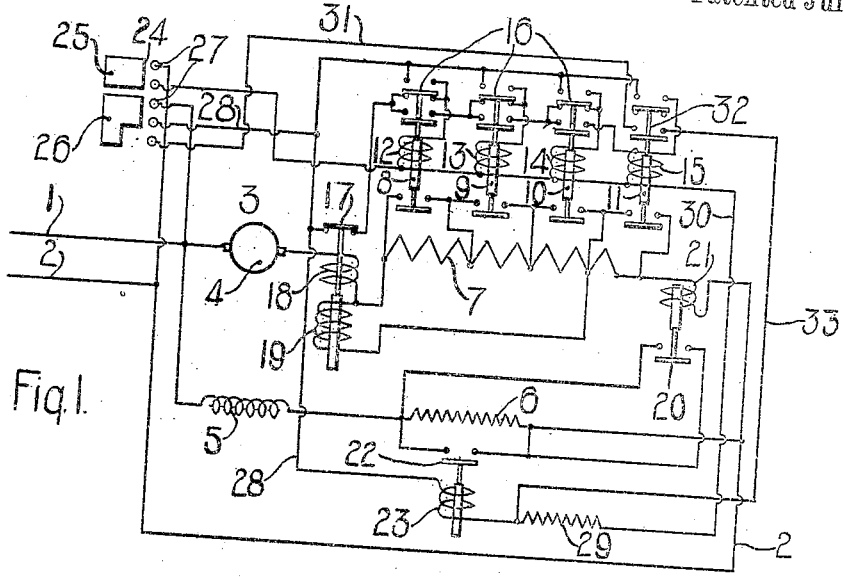
Figure 2:
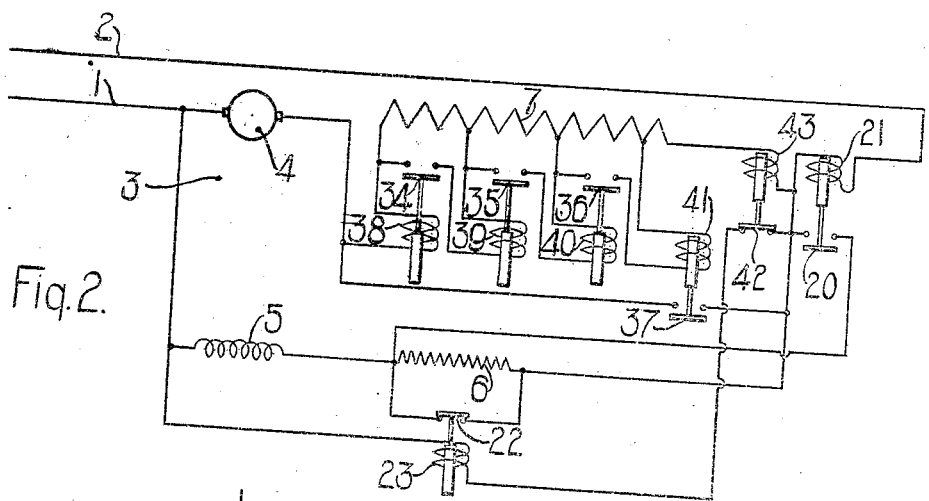
Figure 3:
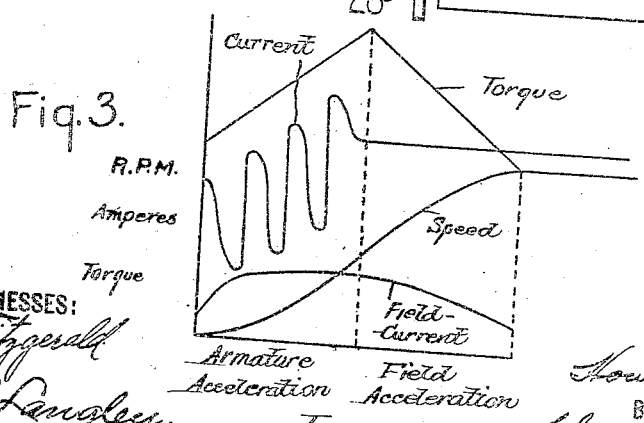

In the accompanying drawings, Figure 1 is a diagrammatic view of circuits and apparatus embodying my invention. Fig. 2 is a view, similar to Fig. 1, of a modification. Fig. 3 is a diagrammatic view of curves indicating the several characteristics of the motor during acceleration.

Referring particularly to Fig. 1, current is supplied from a suitable source, through conductors 1 and 2, to an electric motor 3, the armature of which is indicated at 4. The motor 3 is provided with a shunt field winding 5 that is in series with a field resistor 6. A sectional starting resistor 7, which is in series with the motor armature 4, is adapted to be controlled by a series of electromagnetic switches 8, 9, 10 and 11 having actuating coils 12, 13, 14 and 15, respectively. The several switches 8, 9 and 10 are provided with interlocking switches indicated broadly at 16, which insure that the switches 8, 9, 10 and 11 will operate successively and in a predetermined order.

A compound wound relay switch 17, which controls the operation of the switches 8, 9, 10 and 11, comprises a series coil 18 in circuit with the armature 3 and the resistor 7, and a shunt coil 19 that is connected in parallel with a portion of the resistor 7. A series relay switch 20, having its actuating coil 21 in circuit with the motor armature 3, controls a shunt circuit for the field resistor 6. A shunt-relay switch 22, which also controls a shunt circuit for the resistor 6, has an actuating coil 23. A master switch 24 comprises contact segments 25 and 26 which coact with contact fingers 27 to operate the control circuits of the motor.

It may be assumed that the conductors 1 and 2 are connected, by any suitable means, to a source of current and that the master switch is closed. Current will then flow from the conductor 1 through the contact segment 26, conductor 28, coil 23, resistor 29, conductor 30 and contact segment 25 to the negative conductor 2. The coil 23 will be energized to close the switch 22 and short-circuit the resistor 6. Current will also flow from the positive conductor 1 through the armature 4, coil 18, starting resistor 7 and coil 21 to the conductor 2. The coil 19 will be energized to its maximum degree because of the large drop in potential between the points of its connection to the resistor 7 before the switches 8, 9, 10 and 11 have operated to short circuit sections of the same. When the entire resistor 7 is in circuit, the current through the coil 18 will be a minimum. The switch 17 will be opened when the armature current exceeds a predetermined value at which the combined ampere-turns of the coils 18 and 19 are sufficient to actuate the switch.

When the armature current has fallen to the predetermined value, current will flow from the conductor 1 through the contact segment 26 of the master switch, conductor 28, switch 17, interlock switch 16 and coil 12 to the contact segment 25 which is connected to the negative side of the line. The switch 8 will then close to short-circuit a section of the resistor 7 and, at the same time, to complete a circuit for the coil 13 of the switch 9. The several switches will then close in order to short circuit the entire resistor 7. As the resistor 7 is gradually cut out, the ampere turns of the coil 19 decrease because of the decrease in drop of potential across the terminals of the coil. An increased current will then be required to energize the coil 18 to compensate for the loss of ampere turns in the coil 19. The switch 17 will, therefore, operate only with an increased value of armature current after the closing of each of the switches 8, 9, 10 and 11. This arrangement insures a gradual increase in the armature current during the period of armature acceleration. When the resistor 7 is entirely cut out, the coil 19 is short-circuited and the switch 17 is actuated solely by the coil 18.

When the switch 11 closes, a short-circuit for the coil 23 of the switch 22 is completed by the switch member 32 of the switch 11 which connects the conductors 31 and 33. The switch 22 then opens to remove the shunt around the resistor 6. A second shunt circuit for the resistor 6 is controlled by the switch 20, the series actuating coil 21 of which is adjusted to operate the switch at the same current value as that for which the coil 18 is adjusted when the switch 11 completes the short-circuiting of the resistor 7. The motor will then be further accelerated by the weakening of the field, and the armature current will be maintained at substantially a constant value during this period by the oscillation of the switch 20.

Reference may now be had to Fig. 3 in which the several performance curves of the motor are illustrated. It will be noted that I provide a system which operates to gradually increase the armature current during the period of armature acceleration and to maintain a constant value of the armature current during the period of field acceleration. The result is to gradually increase the torque of the motor to a maximum value that is approximately double the normal operating value as the armature current increases in value, and to gradually decrease the torque to its normal value as the field is weakened. The motor accelerates at a substantially constant rate until it operates at its normal rate. There is no jerk or jar upon the driven mechanism because the speed is increased gradually without abrupt change in the torque of the motor.

A modification is illustrated in Fig. 2 in which like numerals are used to designate corresponding parts. The starting resistor 7 is controlled by a series of self closing switches 34, 35, 36 and 37 that are provided with actuating coils 38, 39, 40 and 41, respectively. The actuating coils, with the exception of coil 38, which is in series with the motor armature 4, are each in series with the preceding switch to close, thus insuring the operation of the several switches in a definite predetermined order. The switches 34, 35, 36 and 37 are arranged to operate successively as the coils 38, 39, 40 and 41 are energized by current of progressively higher values in order to obtain armature acceleration with an increasing torque, as in the system of Fig. 1. A shunt circuit for the field resistor 6 is controlled by a switch 22 having an actuating coil that is in shunt to the motor armature, as in the system of Fig. 1. A relay switch 20, having an actuating coil 21 in series with the motor armature, controls a second shunt circuit for the field resistor 6. A relay switch 42, having an actuating coil 43 in series with the motor armature 4, controls the connections of the coil 23.

Assuming that the conductors 1 and 2 are connected to a source of current by a suitable line switch (not shown), current flows from the positive conductor 1 through the armature 4, coil 38, resistor 7, and coils 43 and 21 to the negative conductor 2. The coil 38 is energized to close the switch 34 and thereby short circuit a section of the resistor 7 through the coil 39. When the current rises to the value for which the coil 39 is adjusted, the switch 35 is closed. In the same manner, the switches 36 and 37 are closed to short circuit the entire resistor 7 and thus effect an increase of the armature current to a maximum value at which the torque of the motor is approximately double the normal operating value. The closing of the switch 37 also short circuits the coil 43, allowing the switch 42 to close and thereby complete a circuit for energizing the coil 23. The switch 22 then opens to insert the resistor 6 in series with the shunt field winding 5. The relay switch 42 is so adjusted that it will close when the current falls to a value below the minimum required to operate the switch 34 and thus begin the operation of the successively operated switches. The switch 42 is also arranged to open at a materially higher current value than that for which it closes. This operation may be secured in various well known ways, as, for example, by providing the switch with a metallic magnetic circuit, the air gap between the relatively movable parts being longer in the open position than in the closed position. By means of the above described operation of the switch 42, the field may be weakened when the current value is below that required to operate the series switches 34, 35, 36 and 37 and the motor thereby accelerated. The weakening of the field will more than likely operate to increase the armature current to a value sufficient to begin the closing of the automatic switches.

After the opening of the switch 22, the field resistor 6 is controlled by the switch 20, the coil 21 of which is adjusted to operate at the maximum current values after the resistor 7 is cut out. The motor is then accelerated to full speed by the oscillation of the switch 20, the weakening of the field decreasing the torque of the motor to its normal value at full speed.

While I have described my invention as applied to a motor operating in one direction only, it will be understood that it may be applied equally as well to motors having means for reversing the direction of their operation.

I claim as my invention:

1. In a motor control system, the combination with a motor, of automatic means for accelerating said motor by gradually increasing its torque to a predetermined maximum and then gradually decreasing the same to a predetermined minimum.

2. In a motor control system, the combination with a source of current, and an electric motor having armature and field windings, of means for automatically increasing the armature current to a predetermined maximum value while the field excitation is substantially constant and for decreasing the field excitation while the armature current remains substantially at a constant value.

3. In a motor control system, the combination with an electric motor having a starting resistor and a field resistor, and a source of current, of means for automatically and gradually short circuiting said starting resistor as the current supplied to said motor increases in value to a maximum and for short circuiting the field resistor while the armature current remains at said maximum value.

4. In a motor control system, the combination with a motor having armature and field windings, and a source of current, of automatic means for gradually increasing the armature current to a predetermined value and at the same time maintaining the current in said field windings at a substantially constant value and for decreasing the current in said field windings and at the same time maintaining the armature current at substantially a constant value.

5. In a motor control system, the combination with an electric motor, and a source of current, of a starting resistor and a field resistor for said motor, of a series of successively actuated switches for controlling said starting resistor, of means controlled by the last of said switches to close for controlling said field resistor, and additional means operable at a predetermined current value for controlling said field resistor.

6. In a motor control system, the combination with a source of current, and an electric motor having a starting resistor and a field resistor, of a plurality of progressively actuated switches for controlling said starting resistor, a switch controlled by the last of said switches to operate for controlling said field resistor, and a second switch actuated at predetermined current values for controlling said field resistor.

7. In a motor control system, the combination with a source of current, and an electric motor having armature and field windings, of resistors in series with said windings, a plurality of switches actuated at progressively increased values of current through said armature windings for short circuiting one of said resistors, and a switch operable at the maximum value of the armature current for controlling the other resistor.

8. In a motor control system, the combination with a source of current, and an electric motor having a starting resistor and a field resistor, of automatic means for controlling said starting resistor, a plurality of shunt circuits for said field resistor, one of which is controlled by said automatic means, and means operable at a predetermined current value for controlling the other shunt circuit.

9. In a motor control system, the combination with an electric motor, and a source of current, of a starting resistor and a field resistor for said motor, of a plurality of automatic switches for controlling said starting resistor, a plurality of shunt circuits for said field resistor, a switch controlled by one of said automatic switches for controlling one of said shunt circuits, and a switch operable at a predetermined current value for controlling the other shunt circuit.

10. In a control system, the combination with a source of current, and an electric motor having a starting resistor and a field resistor, of a plurality of successively actuated switches for controlling said starting resistor, means controlled by the last of said switches to operate for controlling said field resistor, and a switch having an actuating coil in series with said motor and actuated at predetermined current values for controlling said field resistor.

11. In a motor control system, the combination with a source of current, and an electric motor connected thereto and having armature and field windings, of means for accelerating said motor whereby the armature current is gradually increased from full load value with a strong field to a maximum full load value with a weak field, and means for weakening the field of said motor after the armature current has reached said maximum value.

12. The method of accelerating an electric motor which consists in gradually increasing the torque to a predetermined maximum and then gradually decreasing the torque to a predetermined minimum.

13. The method of accelerating an electric motor which consists in gradually increasing the armature current to a predetermined maximum value while maintaining substantially constant field excitation and then decreasing the field excitation at such rate that the value of the armature current remains substantially constant.

In testimony whereof, I have hereunto subscribed my name this 17th day of Oct. 1913.

HOWARD L. BEACH.

Witnesses:
Geo. W. Huey,
B. B. Hines.

Copies of this patent may be obtained for five cents each, by addressing the "Commissioner of Patents, Washington, D. C."